Oct. 6, 1959 K. H. WALKOE 2,907,859
DOMESTIC APPLIANCE
Filed Feb. 19, 1958 2 Sheets-Sheet 1

INVENTOR.
KENNETH H. WALKOE
BY
ATTORNEY

Oct. 6, 1959     K. H. WALKOE     2,907,859
DOMESTIC APPLIANCE
Filed Feb. 19, 1958     2 Sheets-Sheet 2

INVENTOR.
KENNETH H. WALKOE
BY
ATTORNEY

United States Patent Office 2,907,859
Patented Oct. 6, 1959

2,907,859
DOMESTIC APPLIANCE

Kenneth H. Walkoe, Lombard, Ill., assignor to General Electric Company, a corporation of New York Application February 19, 1958, Serial No. 716,079

21 Claims. (Cl. 219—20)

This invention relates to a domestic appliance and more particularly to a device for automatically opening the door of a domestic cooking oven immediately after the cooking operation is complete in order to facilitate cooling of the oven to a temperature below the cooking level.

An important objective in the design of domestic cooking ovens is to provide facilities making cooking operations in the oven more automatic. In this regard, oven timing clocks which can be pre-set to automatically start the oven heat, and turn the oven heat off at a predetermined time are well known and widely used. Also, there is an increasing use of meat thermometers of the type having a probe which is inserted in meat to be cooked and which automatically closes a circuit, causing a signal to be emitted when the probe senses a preselected meat temperature. While these devices have obvious advantages, in one respect an improvement can be made. Although the timing clock can operate a switch to terminate oven heat input at the predetermined time and the thermometer device can emit its signal at a preselected food temperature, cooking of the food will continue so long as the interior of the oven remains at an elevated temperature. In modern, well-insulated ovens, it takes a considerable time for the oven to cool, and if the cook is not present to remove the food from the oven, the unintentional additional cooking after the food has been cooked to the desired degree, may result in an overdone, unappetizing food product. Accordingly, cooking in domestic ovens would be more truly automatic if the oven temperature could be lowered below the cooking level immediately after conclusion of a predetermined time interval or immediately after the food reaches a pre-selected temperature by automatically and simultaneously terminating heat input to the oven and rapidly dissipating the accumulated oven heat.

It is therefore a primary object of my invention to provide a device for use in cooking ovens which will automatically open the oven door for the escape of heat therefrom at the termination of a cooking operation.

Another object of my invention is to provide a domestic cooking oven control system which is automatically effective to simultaneously terminate the oven's heat input and to increase its ventilation, facilitating the rapid dissipation of heat from the oven at the conclusion of a predetermined time interval, or, optionally, when the food being cooked reaches a predetermined temperature.

Still another object of my invention is to provide a control device for ovens which will automatically upon the oven door for the escape of heat therefrom at the termination of a cooking operation therein but will not interfere with normal operation or door movement.

A still further object of my invention is to provide an oven door opening device which is simple, easy to install, and automatically effective to open the oven door on termination of heat input at the conclusion of either a predetermined time interval or after food in the oven reaches a pre-selected temperature.

Briefly stated, in accord with the illustrated embodiments of my invention, I provide a device which automatically moves the door of an electrically heated domestic cooking oven to a partially open position at a signal indicating the termination of an oven cooking operation. The increased ventilation provided by the partially open door rapidly dissipates the accumulated heat in the oven, minimizing further cooking of the food. The device may be selectively operated at either the end of a timed oven operation or when a thermometer senses a pre-selected food temperature. The device includes an electrically energized actuator unit which is arranged to drive a ram from a normally retracted position to an extended position. The moving ram exerts a force which may be suitably applied to the oven door, causing it to move from its closed position to a predetermined, partially open position. Suitable means are provided to hold the door in the partially open position until its release by the cook.

In a completely automatic installation, the oven control circuit may include a timer, a meat thermometer, a ram actuator circuit, and a selector switch to select timer control, thermometer control or manual control of the oven. When timer control is selected, timer switches de-energize the heating units and energize the ram actuator at the end of the predetermined time interval. When thermometer control is selected, means are provided to open a circuit to the heating units and close a circuit for energizing the ram actuator.

The ram actuator circuit is provided with a limit switch which opens the actuator circuit when the oven door reaches a predetermined, partially open position. In a preferred embodiment, the limit switch also simultaneously opens an oven light switch circuit making the oven light inoperative during the time the door is held in the partially open position.

The invention, both as to its organization and method of operation, together with further objects and advantages thereof will best be understood by reference to the following specification taken in connection with the accompanying drawings, in which.

Figure 1:
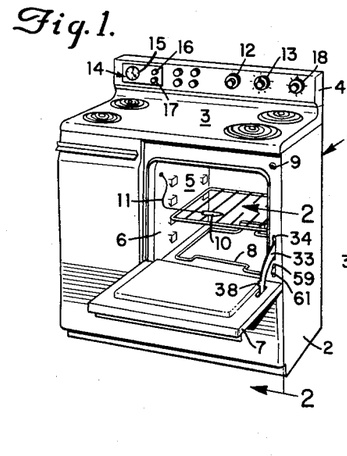
Fig. 1 is a perspective view of a domestic electric range incorporating an oven embodying the present invention, the oven door being shown in its fully open position in order to illustrate details.

Referring now to the drawings and particularly to Fig. 1, I have shown therein an electric range 1 incorporating an oven embodying my invention. The range 1 comprises an upstanding metal body 2 that is provided with a cooking top 3 terminating in an upwardly directed backsplash 4. A cooking oven cavity 5 is defined in the upper right hand portion of the body by a metal oven liner 6. The oven cavity 5 is provided with a door 7 that is hinged adjacent to the lower edge thereof and movable between open and closed positions. In the lower portion of the oven cavity 5, there is shown an electric heating element 8 of the sheathed resistance type in a substantially horizontal position. The oven is also provided with a spring-biased light switch 9 of a well known type which is held in an open circuit condition when the oven door is closed but assumes a closed circuit condition when the door is open. Within the oven is a meat thermometer with a probe 10, suitable for insertion into foods such as meats. Attached to the probe is its associated electric cable assembly 11 for actuating a remote signalling device when the probe attains a predetermined temperature, as later explained.

The circuit network that is provided for the purpose of controlling the operation of the oven, comprises a three-wire Edison source of current supply of 236 volts, single-phase A.C., that includes first and second outside lines L1 and L2, and a grounded neutral line N. The network includes a main oven switch 12 and a three position oven control selector switch 13, both mounted upon the backsplash 4. The selector switch 13 is manually settable to either a timer control position, a manual control position, or a meat thermometer control position. The backsplash also carries a timer switch 14 provided with a clock face 15, a manually settable "on" knob 16, and a manually settable "off" knob 17. In addition, the backsplash 4 carries a manually settable meat thermometer control knob 18.

Figure 5:
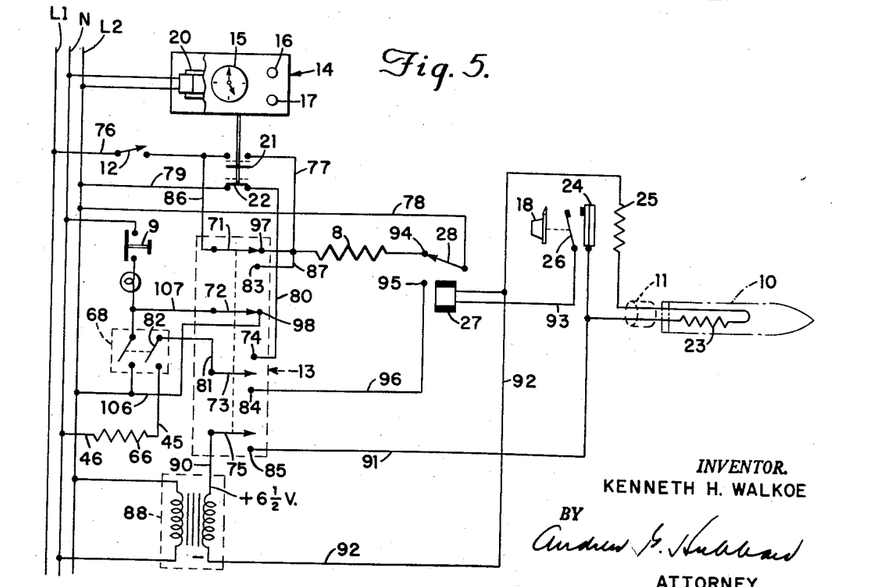
Fig. 5 is an electrical circuit diagram of the oven control network incorporated in the range of Fig. 1.

Preferably the timer switch 14 is of the general construction of that disclosed in U.S. Patent No. 1,522,988, granted on January 13, 1925, to Henry E. Warren, and comprises a synchronous electric motor 20 of the "Telechron" type (see Fig. 5), as well as a pair of contact bridging members 21 and 22. As shown in Fig. 5, the bridging member 21 normally occupies an open position with respect to its associated pair of contacts, while the bridging member 22 normally occupies a closed position with respect to its associated pair of contacts. When the "on" control knob 16 is set to a predetermined clock time the bridging members 21 and 22 will move to the open circuit "set" positions indicated by the broken lines in Fig. 5. Later, at a first pre-set clock time governed by the "on" control knob 16, bridging member 21 will operate into a closed position with respect to its associated pair of contacts, bridging member 22 moving with it to a second open circuit position. Still later, the bridging members will move back to their normal positions as shown in Fig. 5 at a second pre-set clock time governed by the "off" control knob 17. For example, in the timer switch 14, the "on" control knob 16 may be set to a first predetermined clock time, such, for example, as 5 o'clock, and the "off" control knob 17 may be set to a second predetermined clock time, such, for example, as 6 o'clock; whereby the timer switch 14 effects the selective controls noted of the bridging members 21 and 22 at the two previously set clock times so that a cooking operation is carried out in a manner more fully explained hereinafter in the oven cavity 5 from 5 o'clock to 6 o'clock.

The meat thermometer comprises the meat probe 10, its cable assembly 11 containing mutually insulated electrical conductors, a sensing resistor 23 enclosed within the meat probe, a bimetal strip 24 provided with a contact, a heater 25 for the bimetal strip, and a movable contact 26 which is manually set by the control knob 18. These components may be suitably mounted in a housing (not shown) behind backsplash 4 and internally connected in a circuit which preferably includes a power supply with a potential of 6½ volts as shown in Fig. 5. In using the meat thermometer, the control knob 18 is manually set to a desired internal food temperature corresponding with a desired cooked condition of the food. The probe is then inserted into the food, for example, a piece of meat, such as a roast. The sensing resistor 23 contained within the probe 10 is formed of a material having a high negative temperature coefficient of resistance, such as, for example, a ceramic-like material consisting of sintered aluminum oxide, and an oxide of magnesium, manganese, titanium, iron, nickel, cobalt, zinc, and known as "thermistor" material. As the food is being cooked, the temperature at the probe 10 rises. As the sensing resistor within the probe has a negative temperature coefficient of resistance, its resistance will thus decrease. As the voltage remains constant, this increases the current in the thermometer circuit. The bimetal strip heater 25 (which is in series with the sensing resistor 23, see Fig. 5) thereupon produces an increasing amount of heat because of the increased current flowing through it, causing the contact on the bimetal strip 24 to move so as to approach the movable contact 26. When the probe senses the predetermined temperature set by the meat thermometer control knob 18, the current through the bimetal heater will reach the level required to cause the contact of the bimetal strip 24 to close against the movable contact 26. This contact closing completes a circuit to a relay coil 27 as shown in Fig. 5. Associated with relay coil 27 is a movable switch arm 28 which is normally in the closed position shown in Fig. 5. However, when relay coil 27 is energized, it will cause arm 28 to move from the position shown in Fig. 5 to another position as discussed more fully hereinafter.

Figure 2:
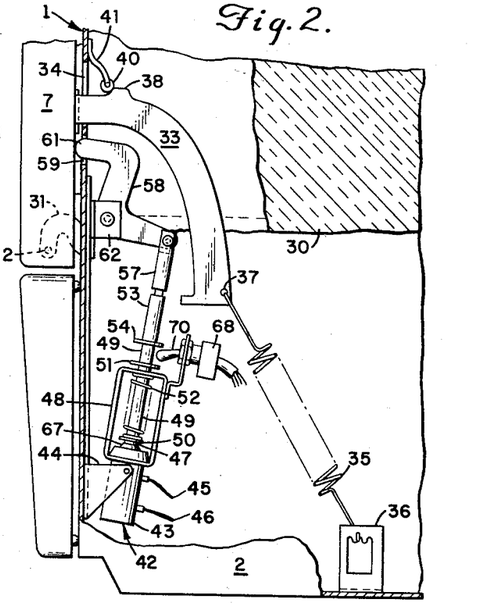
Fig. 2 is a fragmentary side elevation partially in section of the range of Fig. 1 taken along the line 2—2 of Fig. 1, the oven door being shown in the closed position.

Referring now to Fig. 2, the oven door 7 is shown in its closed position, and the outer right side panel of the range is removed in order to illustrate the oven hinging and the oven door opening mechanism. As shown, the oven is provided with a layer of suitable heat insulation 30 which is wrapped around the oven liner. The insulation layer is reduced in thickness immediately behind the front wall of the range providing a space for the hinging mechanism between the insulation 30 and the outer side panel of the range. Suitably secured to the front wall of the range are hinge supports 31, only one of which is shown. The hinge supports cooperate with hinge pins 32 mounted in the door 7 which are inserted through suitable openings in the hinge supports, as indicated in Fig. 2. A suitable hinge lever 33 is secured at one end to the inside of the oven door. The hinge lever projects into the range body through a slot 34 in the front wall of the range. The free end of the hinge lever is attached to the range body by means of a spring 35 which is secured to a bracket 36 on the hinge body and through an opening 37 in the hinge lever. When the oven door is pulled open, the spring 35 acting on the hinge lever end, tends to urge the door back to a closed position. The upper edge of the hinge lever is provided with a cam surface including a projection 38. Above the hinge lever and secured to the inside of the front wall of the range is a cam follower 40 mounted on a spring 41. As the door opens, the cam follower is in contact with the upper surface of the hinge lever moving under it. The spring mounting of cam follower 40 adapts it to climb over the projection 38 when the door is swung open an appropriate amount. Once the door is pulled open to a point where the follower is beyond the projection (as shown in Fig. 3), the cam follower will press against the inside of the projection 38 holding the door partially open against the pull exerted by the spring 35.

Also shown in Fig. 2 are operating components of the oven door opener mechanism. The mechanism includes an electrically heated ram actuator unit 42, the details of which are described more fully in a later part of this specification. The ram actuator 42 is enclosed in a housing 43 which is supported by a base bracket 44 secured to the inside of the range front wall. Extending from the actuator housing are a pair of electrical supply leads 45 and 46. Projecting from the upper end of the housing is a ram 47. The ram is movable outward from the housing to exert a force against a movable push rod assembly consisting of a base, a center section, and a top section described more fully hereinafter. An open structured push rod frame 48 is secured to the upper end of the housing. Suitably secured to the enlarged projecting end of the ram is the push rod base 49 which extends through an opening at the upper end of the push rod frame. The lower end of the base 49 is provided with a flange 50, as shown in Figs. 2 and 3. Above the push rod frame, the push rod base has another flange 51 for a purpose discussed more fully below. Enclosing lower portions of the push rod base is a return spring 52 which is located between the flange 50 on the lower end of the push rod base and the push rod frame. The push rod center section 53 is mounted upon the upper end of the push rod base. The push rod center section has a lower flange 54 and a round base cavity 55 which slidably encloses a reduced diameter portion 56 of the push rod base as shown in Fig. 4. As a result of the sliding connection between the push rod base 49 and the push rod center section 53, the push rod assembly acts as a unit when the oven door is being opened by the actuator, but will separate at the sliding connection when the ram retracts as later described. It will be noted that the upper end of the push rod center section is provided with external threads (see Fig. 4). Secured to the push rod center section 53 is the push rod top section 57 which has an internally threaded base cavity engaging the top threaded portion of the center section. The provision of the threads on the center and top sections of the push rod assembly permits its length to be adjusted in order to eliminate lost motion. The movement of the push rod assembly is applied against the door 7 by means of a bell crank 58. The crank 58 has an arm which is pivotally mounted to the push rod assembly by a pin inserted in the push rod top section 57. The front wall of the range contains a slot 59 to permit passage of a free arm 61 of the bell crank which is movable against the inside of door 7. The bell crank is pivotally mounted to the inside of the front wall of the range by means of a bell crank base 62 which is suitably secured to the range wall. As shown, the bell crank may be used to magnify the motion of its attached push rod assembly by proper choice of pivot location and bell crank arm proportions. This may be desirable in order to adapt the ram stroke to move the door to a desired partially open position. It will also be noted that the push rod and bell crank arrangement shown and described, permits the ram actuator unit to be installed in a location remote from the oven. This prevents a premature ram actuation due to oven heat.

Figure 3:
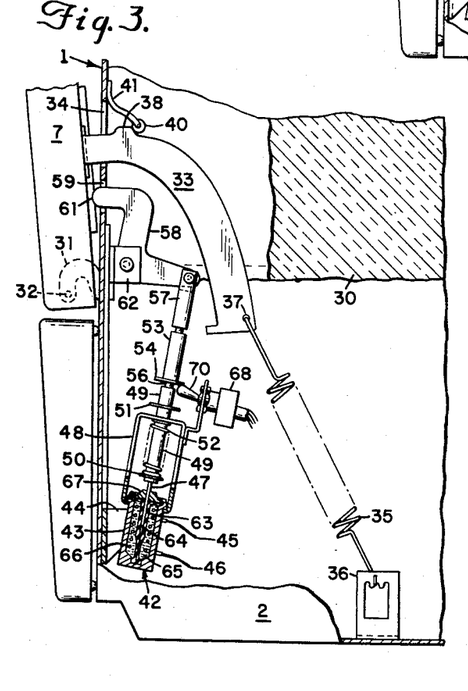
Fig. 3 is a fragmentary side elevation similar to Fig. 2, but showing the oven door in its ram-actuated position and the ram itself in a partially retracted position.
Figure 4:
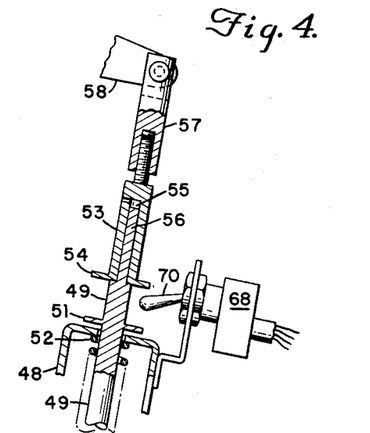
Fig. 4 is a fragmentary side elevation partially in section of a portion of the oven door opening mechanism of Fig. 2.

The internal construction of the ram actuator unit 42 is shown in detail in Fig. 3. The unit consists of the housing 43 which contains a synthetic rubber bladder 63 which encloses an ogive shaped base 64 of the actuator ram 47. Surrounding the bladder is a quantity of a temperature sensitive material 65 which acts upon temperature change to increase or decrease in volume. The composition of the temperature sensitive material may be the same as that shown and described in S. Vernet et al. Patent No. 2,259,846, issued October 21, 1941. Embodied in the temperature sensitive material is a heating element 66. The top of the actuator unit is suitably enclosed by a sealing cap 67 which may be of brass. To operate the ram, an electrical current is passed through the heating unit element 66 in the temperature sensitive material, causing it to melt. As the material changes from a solid to a liquid state, it expands and creates high pressure against the bladder 63, which squeezes the ogival end of the ram and thereby causes the ram 47 to be axially displaced to an extended position as indicated in Fig. 3. The preferred ram actuator unit shown and described is relatively fast in operation, requiring only about 30 seconds to heat up and move the ram to the desired extended position. When the heating element is de-energized, the temperature sensitive material quickly solidifies and contracts in volume, permitting the spring 52 to return the ram to its original retracted position as shown in Fig. 2. It will be noted that the ram return will carry with it the push rod base 49 which is secured to the top end of the ram.

A suitable limit switch 68 is secured to the push rod frame 48. In a preferred form, the limit switch 68 may be of the conventional on-off toggle switch type. The limit switch 68 is provided with an operating arm 70. As shown in Fig. 5, the limit switch is of double pole construction and controls circuits both to the actuator unit and to the oven light switch. When the operating arm 70 is in the down position, as shown in Fig. 2, the actuator unit circuit and the oven switch circuit are closed (see Fig. 5) in regard to the limit switch 68.

The invention will best be understood by describing its operation during an oven cooking cycle. We will assume that the cook wishes to bake a cake, using timer control, for example. She first sets the timer clock by turning "on" control knob 16. Specifically, the control is set at the time it is wished to initiate the baking operation, such as, for example, 5 o'clock; and the "off" control knob 17 is set to the clock time at which it is wished to arrest the baking operation, such as, for example, 6 o'clock. When the "on" control knob is thus operated to a set position, the bridge members 21 and 22 will move to the open circuit "set" positions indicated by the broken lines in Fig. 5. Then the cook operates the selector switch 13 for timer control. When the selector switch is moved from the manual control position shown in Fig. 5 to the timer control position, the switch blades 71 and 72 will be moved into open circuit position, switch blade 73 will be moved into engagement with contact 74, and switch blade 75 will be moved into open circuit position. When the selector switch 13 is thus operated to its timer control position, a circuit is prepared for energizing the heating element 8 across the outside lines L1 and L2. The cook then places the cake in the oven and closes the main oven switch 12. When the clock 15 of the timer switch 14 reaches the 5 o'clock position set by the "on" control knob 16, the bridging member 21 is operated into a closed position with respect to its associated pair of contacts. We thus have a circuit energizing the heating element 8. This circuit extends from the outside line L1 via line 76 through closed switch 12, through bridging member 21, through line 77, through heating element 8, through relay switch arm 28, through line 78 to outside line L2. The heating element 8 will then develop its full wattage resulting in a baking of the cake in the oven cavity. The cooking operation proceeds until the clock 14 reaches the 6 o'clock position set by the "off" control knob 17; whereupon the contact bridging members 21 and 22 are operated back into their normal positions, as shown by the solid lines in Fig. 5. This movement of the bridging members will simultaneously open the circuit to the heating element 8 terminating heat input to the oven and close a circuit to the ram actuator unit heating element 66. The circuit to the actuator heating element can be traced as follows: from outside line L2 through line 79, through bridging member 22, through line 80, through switch blade 73, through line 81, through a switch blade 82 of limit switch 68, through actuator unit heating element 66 to neutral. The circuit through the heating element will cause an expansion of the temperature sensitive material 65, as more fully described above, forcing the ram to its extended position and causing the push rod assembly to operate the bell crank arm 61 against the inside of door 7 forcing the oven door to the partially open position, shown in Fig. 3. As the push rod assembly is moved upward by the ram, the flange 51 on the push rod assembly carries limit switch operating arm 70 to its "up" or open circuit position whereupon the circuit is broken to the ram actuator heating element and to the oven light switch. As the door reaches a partially open position, as shown in Fig. 3, it will be held by the co-operation between projection 38 and follower 40. The heat that has accumulated in the oven during the cooking operation will thereupon be rapidly dissipated because of the added ventilation provided by the door opening, cooling the oven to a temperature below the cooking level in a relatively short time. Thus, my invention provides a means whereby baking of the cake will be discontinued almost immediately after the conclusion of the predetermined cooking period, rather than at a somewhat later time, avoiding the possibility of overcooking the cake.

It will be noted that as limit switch 68 and switch blade 72 are in open circuit condition, the oven light cannot be energized at this time, even though oven light switch 9 is in a closed circuit condition because of the open oven door.

Breaking of the circuit to the actuator unit heating element 66 by the limit switch permits the material 65 to cool, allowing the spring 52 to return the ram to its original retracted position as shown in Fig. 2. The ram return will carry with it the push rod base 49 which will slide downward relative to push rod center section 53. This return movement is indicated in Fig. 3 wherein the ram is shown in a partially retracted position. This downward movement of base 49 will permit the push rod center and top sections 53 and 57 to move downward also. However, as the center section flange 54 will be arrested by the limit switch operating arm 70, the push rod center and top sections 53 and 57 and the bell crank 58 will be held in the positions shown in Fig. 3. When the cook returns to the range she will turn off main switch 12, and pull the door 7 to a fully open position as shown in Fig. 1 and remove the cake. When the cook closes the oven door, arm 61 will be caused to pivot inward, forcing the top and center sections of the push rod assembly downward to the position shown in Fig. 2. As flange 54 is forced down it will push limit switch operating arm 70 down to its closed circuit condition as shown in Fig. 2. The ram actuator circuit is thus prepared for a new cycle and the oven light circuit is restored to its normal condition.

Now, let us assume that the cook wishes to perform a thermometer control oven cooking operation. We will assume that the cook wishes to cook a piece of meat, such as a roast. The cook will prepare the roast and place it on a rack in the oven. The cook will then insert the meat probe 10 into the center of the roast. The cook will then set the thermometer control knob 18 to the desired internal heat temperature corresponding with a desired cooked condition of the food. The oven control selector switch 13 is then set to the thermometer control position. This will move switch blade 71 into engagement with a contact 83, switch blade 72 into open circuit position, switch blade 73 into engagement with a contact 84, and switch blade 75 into engagement with a contact 85 (see Fig. 5). The main switch 12 is then moved to its closed position. We then have the oven heating element 8 in a closed circuit, producing heat, resulting in cooking of the meat. The circuit can be traced from outside line L1 through line 76, through switch 12, through line 86, through switch blade 71, through line 87, through heating element 8, through relay switch arm 28 and through line 78 to L2. There is also a circuit closed from a meat thermometer transformer 88, which preferably has a 6½ volt output side, through the meat probe sensing resistor, through the bimetal heater, and back to the transformer. This circuit can be traced as follows: starting at the positive terminal of the 6½ volt side of the transformer 88, through line 90, through switch blade 75, through line 91, through sensing resistor 23, through heater 25, and through line 92 to the negative side of the transformer. As the temperature of the meat increases due to the cooking operation, the resistance of the sensing resistor will decrease. As the sensing resistor resistance decreases, an increasing amount of current flows through the heater 25. The increasing current increases the heat produced by the heater 25, causing a corresponding movement of the bimetal strip 24. As cooking continues, the bimetal strip contact moves closer and closer to the movable contact 26. When the thermometer probe 10 senses the predetermined temperature set by the control knob 18, the contact of bimetal strip 24 will close against movable contact 26. This completes a circuit to the relay coil 27. This circuit can be traced as follows: starting from the positive terminal of the 6½ volt side of the transformer through line 90, through switch blade 75, through line 91, through bimetal strip 24, through line 93, through relay coil 27, and through line 92 to the negative side of the transformer. As current flows through the relay coil 27, switch arm 28 is moved from contact 94 into engagement with contact 95. This opens the circuit containing oven heating element 8, terminating oven heat input, and closes a circuit to the ram actuator heating element 66. This last named circuit starts at L2, continues through line 78, switch arm 28, line 96, switch blade 73, line 81, switch blade 82, and actuator heating element 66 to neutral. As current flows through the heating element 66 of the ram actuator, the ram will be actuated to its extended position, resulting in opening of the oven door to its partially open position as described more fully above. Thus, oven heat input is terminated and the oven door is opened almost immediately after the meat reaches the desired internal temperature.

It will be noted that as limit switch 68 and switch blade 72 are in open circuit condition, the oven light cannot be energized at this time, even though oven light switch 9 is in a closed circuit condition because of the open oven door.

The main switch 12 may be turned to its "off" position and the door closed by the cook after the roast is removed from the oven.

Now, let us assume that the cook wishes to perform a manual control cooking operation in the oven. The selector switch 13 is then set for manual control; switch blade 71 will then engage contact 97, switch blade 72 will engage contact 98, and switch blades 73 and 75 will move into open circuit position as shown in Fig. 5. When the oven main switch 12 is closed, we then have a circuit through oven heating element 8 as follows: starting from the line L1 through line 76, through switch 12, through line 86, through switch blade 71, through heating element 8, through switch arm 28 and through line 78 to L2. As switch blade 73 is in open circuit position, we have an open circuit to the ram actuator heating element. Thus, my oven door opening invention is inoperative when the cook selects manual control of the oven.

Figure 6:
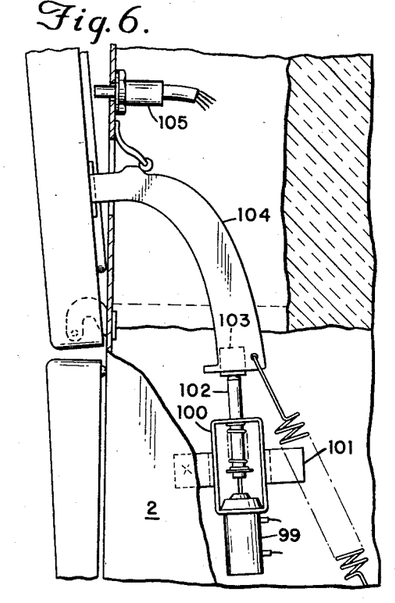
Fig. 6 is a fragmentary side elevation partially in section of a range incorporating a modification of my oven door opening invention, the door being shown in the partially open position.

In Fig. 6, I have shown a modification of the invention which is somewhat simpler than that described above, due to the fact that it eliminates the push rod assembly and the bell crank arm. However, because the motion magnification possibilities of the bell crank arm are no longer present, a somewhat larger ram actuator unit may be required in order to obtain the desired oven door movement. Referring now to Fig. 6, the modification shown therein consists of a ram actuator unit 99 which is identical to unit 42 described hereinbefore, except that it may have a somewhat longer ram stroke. The unit 99 is provided with a frame 100 secured to the upper portion of the unit housing. The unit is suitably secured to the range outer panel by a pair of brackets 101. As shown, the elongated actuator ram 102 bears against an angle bracket 103 suitably secured to the hinge lever 104. When the ram heating element (not shown) is energized, the ram 102 pushes against bracket 103 moving the hinge lever and thereby the door to a partially open position. The electrical circuit for the modification shown in Fig. 6 is substantially the same as that previously described and shown in Fig. 5. However, it should be noted that the limit switch 105 used with the modification shown in Fig. 6 has a somewhat different external construction than that of the limit switch 68. As shown in Fig. 6, the limit switch 105 will be held in a closed circuit condition when the door is closed, but will be biased by an internal spring (not shown) to an open circuit condition when the door reaches the partially open position shown in Fig. 6.

It will be noted that during manual control the oven light will be operative even though the limit switch will assume an open circuit position if the door is opened. As shown, a parallel auxiliary circuit, by-passing the limit switch portion of the light circuit, is closed by switch blade 72 during manual control of the oven. The oven light circuit when the door is opened during manual control is then as follows: from L2 through line 106, through switch blade 72, through line 107, through the light, and through light switch 9 to neutral.

Figure 7:
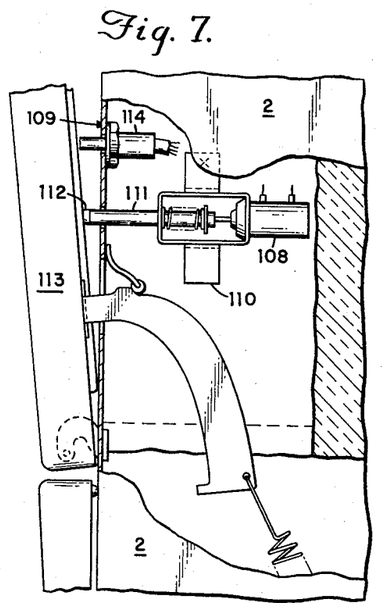
Fig. 7 is a fragmentary side elevation partially in section of a range incorporating still another modification of my oven door opening invention, the door being shown in the partially open position.

Referring now to Fig. 7, I have shown therein still another modification of my invention. In this modification, the ram actuator unit 108 moves the ram itself into contact with the oven door. Here again as in the modification shown in Fig. 6, the ram actuator may be increased somewhat in size over the actuator shown in Figs. 2 and 3 in order to obtain the appropriate ram movement to force the oven door to a desired partially open position. Also, it should be noted that substantial heat insulation may be required between the actuator and the oven, to protect it from the heat of the oven cavity 109 extending directly behind the actuator, and it is also desirable to provide suitable vents (not shown) in the range side wall to expedite the dissipation of heat from the actuator. However, the modification shown in Fig. 7 is advantageous for its simplicity and the small number of required parts. As shown, the ram actuator unit 108 is secured in relation to the oven by means of a pair of suitable angle brackets 110 appropriately attached to an outer side panel of the range. Here again, the circuit used to energize the heating element of the ram actuator is substantially the same as that shown in Fig. 5 and described above. The elongated ram 111 may be provided with a buffer tip 112 which may be of silicone rubber to cushion the blow from the ram exerted against the inside of the oven door 113. As shown, the limit switch 114 used with this particular modification is identical in construction and operation to that shown in Fig. 6 and discussed above.

While there has been described what is at present considered to be the preferred embodiments of the invention, it will be understood that various modifications may be made therein, and it is intended to cover in the appended claims all such modifications as fall within the scope of the invention.

I claim:

1. In a cooking oven having a door, means for releasably maintaining said door in a predetermined partially open position, heating means in said oven, and time-cycle means for energizing and de-energizing said heating means to effect a timed cooking operation: mechanism for operating said door from a closed to the said partially open position at the termination of said cooking operation; comprising a ram; a housing therefor; means for mounting said housing in fixed relation to said door; a thermal element in said housing, said element expanding or contracting according to the direction of change in temperature thereof; means responsive to the expansion of said element to drive said ram in door-opening direction; means responsive to the contraction of said element to drive said ram in reverse direction; a bell crank; means for pivotally mounting said bell crank for rotation relative to said door, one leg of said bell crank having a projection engageable with said door to urge the same to said partially open position upon rotation of said bell crank in one direction; a push rod articulatedly associated with another leg of said bell crank; means including a telescoping connection between said push rod and said ram to transmit movement of said ram in the first-named direction for rotation of said bell crank in door-opening direction but rendering movement of said ram in the opposite direction ineffective to rotate said bell crank; means for adjusting the effective length of said push rod relative to said bell crank and said ram whereby upon manual rotation of said door to closed position said push rod will be repositioned for actuation by said ram with minimum lost motion therebetween; a guide frame fixed to said ram housing for guiding said ram and said push rod in rectilinear movement; means including an electric energy circuit and a heating element for effecting the expansion of said thermal element; a first switch in said energy circuit; means on said push rod to actuate said switch to closed circuit condition upon movement of said oven door to closed position; means on said ram to operate said switch to open circuit condition upon predetermined movement of said ram in door-opening direction; a second switch in series with said first switch; means for operating said second switch to open circuit condition coincident with the energizing of said over heating means, and means for operating said second switch to closed circuit condition coincident with the de-energization of said oven heating means.

2. Means for ventilating a cooking oven to rapidly dissipate heat therefrom upon attainment of a desired condition in a cooking operation, said oven having an opening affording communication with the ambient atmosphere, comprising a member movable between a manually established non-ventilating position relative to said opening and a mechanically established ventilating position relative thereto, a ram, a housing for said ram, means for mounting said housing in fixed position relative to said member, means for guiding said ram in a first direction for operation of said member by said ram to the said ventilating position, ram actuator means responsive to an increase in the temperature thereof to drive said ram in its said first direction, means for releasably maintaining said member in its said ventilating position after its movement thereto by said ram, an electric heating element in heat exchange relation with said ram actuator means to effect the increase in temperature thereof, an electric circuit for energizing said heating element, switch means effective upon movement of said member to non-ventilating position to prepare said circuit for energizing said heating element, switch means for completing the said energy circuit to energize said heating element, means for operating said last-named switch means to complete said energy circuit upon attainment of said desired cooking condition, whereby the temperature of said ram actuator is increased and the ram is actuated thereby to move said member to its said ventilating position, means for operating said first-named switch to interrupt said energy circuit upon movement of said member to its said ventilating position, and means for maintaining said first-named switch in said circuit-interrupting condition so long as said member remains in its said ventilating position.

3. A domestic appliance, comprising, in combination: a cooking oven, a door therefor, means for releasably maintaining said door in a predetermined partially open position to ventilate said oven after a cooking operation, heating means in said oven, means for activating said heating means to begin a cooking operation, means for deactivating said heating means to terminate said cooking operation, a ram effective upon movement in a first direction relative to said door to operate said door from a closed position to said ventilating position, a housing for said ram, means for mounting said housing in fixed relation to said door, means for guiding said ram for rectilinear movement relative to said housing, a thermal element, means responsive to an increase in temperature of said thermal element to effect movement of said ram in said first direction, means including an electric energy circuit and a heating element therein for increasing the temperature of said thermal element; means actuated by the closing of said oven door for preparing said energy circuit, means for completing said circuit for energizing the heating element thereof upon deactivation of said oven heating means, means responsive to predetermined movement of said ram in its first named direction to interrupt said energy circuit to effect said reduction in temperature of said thermal element, and means for maintaining said energy circuit in interrupted condition during the ensuing reverse movement of said ram.

4. In a cooking oven having a door, means for releasably maintaining said door in a predetermined partially open position, heating means in said oven, and means for energizing and de-energizing said heating means pursuant to a predetermined cooking operation: mechanism including a ram of operating said door from a closed to said partially open position; a housing for said ram, means for mounting said housing in fixed relation to said door; a thermal element in said housing, said thermal element expanding or contracting according to the change in temperature thereof; means responsive to the expansion of said element to drive said ram in door-opening direction; means responsive to the contraction of said element to drive said ram in reverse direction; means including an electric energy circuit and a heating element therein for effecting the expansion of said thermal element; a first switch in said energy circuit; means for actuating said switch to closed circuit condition upon movement of said door to closed position; means for actuating said switch to open circuit condition upon movement of said door to its said partially open position; a second switch in said energy circuit in series with said first switch; means for operating said second switch to open circuit position coincident with the energizing of said oven heating element at the beginning of said cooking operation; and means for operating said second switch to closed circuit condition coincident with the de-energization of said oven heating element, whereby at the conclusion of the cooking operation the temperature of the oven may be quickly lowered by reason of the partially open position of the oven door, thus preventing the continued cooking of the food in the oven.

5. A cooking oven having a door; means for releasably maintaining said door in a predetermined partially open position; an electrical heating element; an electric circuit for energizing said heating element; a switch for controlling said energy circuit; selectively settable control means for operating said switch between closed and open circuit conditions according to a predetermined cooking schedule; an oven door opening mechanism comprising, a ram; a housing for said ram; means for pivotally securing said housing to said oven; electrically operated means within said housing to move said ram from a retracted first position to an extended second position; an electric circuit for energizing said ram actuating means; a switch for controlling said ram actuating circuit; means for operating said second named switch to an open circuit condition upon operation of said first named switch to a closed circuit condition; means for operating said second named switch to a closed circuit condition upon operation of said first-named switch to an open circuit condition; a guide frame secured to said housing; a push rod base secured to said ram, said base projecting through an opening in said frame; spring means arranged between said frame and said base to urge said ram to return from said second position to said first position; a limit switch in series with second named switch in said actuator circuit; a movable switch operating member for operating said limit switch into open or closed circuit condition; means associated with said push rod base engageable with said limit switch operating member so as to operate said switch into its open circuit condition as said ram reaches said second position; a push rod center section; means on said center section engaging with said push rod base for operation by said push rod base from a first to a second position upon movement of said ram to its extended position; means for slidably mounting said center section on said push rod base, whereby said push rod base will retract from said center section upon retraction of said ram; means associated with said center section engageable with said limit switch operating member so as to operate said limit switch into closed circuit condition when said center section is in its said first position relative to said push rod base; a push rod top section in threaded engagement with said center section, said push rod base, said center section, and said top section together constituting a rectilinear push rod assembly, the threaded connection between said center section and said top section providing a means to establish a predetermined minimum length of said assembly; a mounting bracket secured to said oven; and a bell crank pivotally mounted to said bracket, said bell crank having a rear portion pivotally attached to the top section of said push rod assembly and a movable front portion adjacent the inside of said oven door, said crank being movable about its mounting by said push rod assembly during movement of said ram to its extended position to cause said front portion to move against said oven door and thereby urge said door to its said partially open position; whereby when the oven has been operated to the completion of said predetermined schedule, the control means will open said first named switch, terminating oven heating, said second named switch will be disposed in closed circuit condition to actuate said ram and the push rod assembly to move said door to its said partially open position; the movement of said ram causing said operating member to open said limit switch to terminate further movement of said ram.

6. A cooking oven according to claim 5 in which the control means consists of a sequence timer having timer operated switches associated therewith.

7. A cooking oven according to claim 5 in which the control means consists of a heat actuated switching device which is responsive to a predetermined internal food temperature.

8. A cooking oven, comprising, in combination: a door, said door being movable from a closed position to a partially open position; means for releasably holding said door in said partially open position; a heating element to heat said oven to a predetermined cooking temperature level; an electrical energy source, a first circuit for connecting said heating element to said energy source; a switch operable between open circuit and closed circuit conditions in said first circuit; control means for operating said switch between open and closed conditions according to a predetermined cooking schedule; a ram disposed in the path of said door; an electrical ram actuator including mounting means in fixed relation to said door, said actuator, on energization thereof, moving said ram from a first position substantially in contact with the inside of said door in its closed position to an extended second position, the movement of said ram carrying said door from its closed position to its partially open position; a second circuit for connecting said actuator to said energy source; a limit switch operable between open circuit and closed circuit conditions in said second circuit, said limit switch having an operating member provided with biasing means disposed in the path of said oven door, the operating member being held in a position corresponding with a closed circuit condition of said limit switch by said door when said door is in its closed position but moving, because of said biasing means, to a position corresponding with an open circuit condition of said limit switch when said door is moved to its partially open position; and switch means in said second circuit in series with said limit switch, said second circuit switch means being operable by said control means into closed circuit condition immediately after said heating element becomes inactive due to the opening of said first circuit switch by said control means according to said predetermined cooking schedule, whereby said door is carried by the movement of said ram to its said partially open position and is maintained in said poistion by said holding means, the partially open position of said door facilitating the rapid cooling of said oven below said predetermined cooking temperature level.

9. A cooking oven having a door, comprising, in combination: means for releasably holding said door after it is moved into a partially open position; an electrical heating element for heating said oven; an electric energy source; a circuit connecting said heating element to said energy source; a switch in said heating element circuit; selectively settable control means for operating said switch between open and closed conditions according to a predetermined cooking schedule; a ram; an electrically operated ram actuator including mounting means, said actuator on energization thereof, moving said ram from a retracted first position to an extended second position; spring means arranged to urge said ram to return from said second position to said first position; a circuit connecting said actuator to said energy source; a second switch operable by said control means in said actuator circuit, said control means operating said second switch to a closed circuit condition when it operates said first switch to an open circuit condition; means to interrupt said actuator circuit, said interrupting means being operative when said ram attains a predetermined position on its traverse between said first and said second position; a push rod assembly secured to said ram, said push rod assembly being movable by said ram from a retracted first position to an extended second position; means for pivotally mounting a lever member to said oven; and a lever member pivotally secured at one of its ends to the end of said push rod assembly remote from said ram and at an intermediate location to said pivotal mounting means, said lever member being movable about its mounting by the movement of said push rod assembly so as to cause its unsecured end to move against the inside of said oven door carrying said oven door to its partially open position, whereby when the oven has been operating a predetermined time, the control means will operate said first switch into open circuit condition, terminating oven heating, and operate said second switch into closed circuit condition, actuating the movement of said ram from said first position toward said second position, said push rod assembly moving the unsecured end of said lever member against said oven door, forcing the door to its partially open position, engaging said holding means, said interrupting means operating to open said actuator circuit as the ram attains said predetermined position terminating ram movement at said second position, the partially open position of said door facilitating the rapid dissipation of heat from said oven.

10. A domestic appliance comprising, in combination: a cooking oven; a door for the oven; means for releasably holding said door in a predetermined partially open position; heating means to heat the oven to a predetermined cooking temperature; an electric energy source; a first electrical circuit for connecting said heating means to said energy source; first switch means in said first circuit operable between open circuit and closed circuit condition; control means in said circuit for operating said first switch means between open and closed circuit conditions according to a predetermined cooking schedule; means to move said door from a closed to the said partially open position; a thermally responsive expansion member to actuate said door moving means; an electrical heating element to heat said expansion member; a second electrical circuit for connecting said heating element to said current supply source; and second switch means operable by said control means between open circuit and closed circuit condition in said second circuit, said control means operating said second switch means into closed circuit condition immediately after said heating means becomes inactive due to the operating of said first switch into open circuit condition by said control means according to said predetermined cooking schedule, whereby said door is opened to its said partially open position by the actuation of said moving means after said heating means becomes inactive, facilitating the cooling of said oven below said predetermined cooking temperature level.

11. A cooking oven, comprising, in combination: heating means; regulating means for making said heating means operative or inoperative; selectively settable electrical control means for controlling said regulating means according to a predetermined cooking schedule; an electric energy source; a first circuit connecting said electrical control means to said supply source; a door for the oven; means for releasably holding said door in a predetermined partially open position; means to move said door to the said predetermined partially open position; an electrically heated, thermally responsive actuator to actuate said moving means; a second circuit for connecting said actuator to said energy source; and switch means operable by said control means between open circuit and closed circuit conditions in said second circuit, said control means operating said switch means into closed circuit condition immediately after said heating means is regulated into an inoperative condition by said control means according to said predetermined cooking schedule, whereby said door is opened to its said partially open position by said moving means when said heating means becomes inoperative, facilitating the cooking of said oven below said predetermined cooking temperature level.

12. A cooking oven having a door; means for releasably holding said door in a partially open position; an electrical heating element for heating said oven; an electric energy source; a circuit connecting said heating element to said energy source; a switch in said heating element circuit; control means for operating said switch to a closed circuit condition initiating a cooking operation and an open circuit condition terminating said cooking operation; a ram; an electrically operated ram actuator; mounting means for said actuator; a circuit connecting said actuator to said energy source; a switch in said actuator circuit; means to operate said second named switch to a closed circuit condition for energization of said ram actuator when said control means operates said first-named switch to an open circuit condition, the energization of said actuator causing said ram to move from a retracted first position to an extended second position; means disposed intermediate said ram and said door to bring to bear the force exerted by said ram against said door so as to move it from its closed position to its said partially open position; and means for interrupting said actuator circuit when said door reaches a predetermined open position, whereby when the control means terminates said cooking operation, said actuator will be energized for movement of said ram from said first position toward said second position, bringing said door to its said partially open position; said interrupting means operating to terminate ram movement as the door reaches said predetermined open position.

13. In a cooking oven according to claim 12 in which the means disposed intermediate said ram and said door is a push rod assembly connected to the ram and an associated bell crank member.

14. In a cooking oven according to claim 12 in which the means disposed intermediate said ram and said door is a hinge member attached to the oven door which receives the force exerted by the ram movement.

15. In a cooking oven according to claim 12 in which the means disposed intermediate said ram and said door is a resilient buffer member secured to the end of the ram.

16. A domestic appliance, comprising, in combination: a cooking oven; an access opening in a wall of said oven; a door for said opening, said door being movable from a closed position to a partially open position; means for releasably holding said door in said partially open position; a movable hinge member attached to said door; a heating element to heat said oven to a predetermined cooking temperature level; an electric energy source; a first circuit for connecting said heating element to said energy source, a switch operable between open circuit and closed circuit condition in said first circuit; selectively settable control means for operating said switch between closed and open circuit conditions according to a predetermined cooking schedule; a ram; means for mounting said ram for rectilinear movement; electrically actuated means for driving said ram from a retracted first position to an extended second position; means for transmitting said driving movement of said ram to said hinge member to move said door to its said partially open position as said ram attains its said second position; a second circuit for electrically energizing said ram driving means; a limit switch operable between open circuit and closed circuit conditions in said second circuit; means responsive to said door in its closed position to operate said limit switch into closed circuit condition to prepare said second circuit; means responsive to the movement of said door to its partially open position to operate said limit switch into open circuit condition; and switch means in said second circuit in series with said limit switch, said second circuit switch means being operable by said control means to complete said second circuit upon inactivation of said heating element by the opening of said first circuit switch by said control means, whereby said door is carried by the movement of said ram to its said partially open position and is maintained in said position by said holding means, the partially open position of said door facilitating the rapid cooling of said oven below said predetermined cooking temperature level.

17. A cooking oven having an access opening, comprising, in combination: a door over said opening; means for releasably holding said door open when it is moved to a partially open position; heating means for said oven; an electric energy source; a first circuit for connecting said heating means to said energy source; switching means operable between open circuit and closed circuit conditions in said first circuit; an electric light within said oven; an oven light circuit connecting said light to said energy source; first switch means in said light circuit disposing the circuit in open condition when said door is closed but operating to close the circuit when said door is opened; control means for manually operating said first circuit switching means between open and closed circuit conditions; selectively settable automatic control means for operating said first circuit switching means between open and closed circuit conditions according to a predetermined cooking schedule; an oven control selector switch having manual control and automatic control positions to make the desired control means operative, said selector switch being operative into one of said manual control or said automatic control positions; means to move said door to a partially open position; an electrical actuator to actuate said moving means; a second circuit for connecting said actuator to said energy source, a switch operable between open and closed circuit conditions by said automatic control means in said second circuit; a limit switch in said second circuit operable between open and closed circuit conditions; second switch means in said light circuit associated with said limit switch; a switch operating member responsive to said door position for simultaneously operating said limit switch and said second switch means into either open circuit condition or closed circuit condition, said operating member being disposed in closed circuit position when the door is closed, but assuming an open circuit position when the door is opened; an auxiliary circuit connected to said oven light circuit, said auxiliary circuit providing a parallel electric current path around the portion of the oven light circuit containing said second switch means; and a switch in said auxiliary circuit, said auxiliary circuit switch being operated into closed circuit condition by said selector switch preparing an oven light circuit, when said selector switch is moved into its manual control position, and into open circuit condition by said selector switch when said selector switch is moved into an automatic control position, whereby under manual control of the oven, said oven light circuit is completed on opening of the door under the control of said first switch means, but under automatic control of the oven, because no oven light circiut is prepared, the light will not operate when said door is moved to its partially open position at the conclusion of the predetermined cooking schedule.

18. A cooking oven, comprising, in combiantion: electrical heating means; an electric energy source; a first circuit for connecting said heating means to said energy source; switching means operable between open circuit and closed circuit conditions in said first circuit; timer control means consisting of a selectively settable sequence timer for operating said switching means between open and closed circuit conditions according to a predetermined cooking time schedule; thermometer control means consisting of a selectively settable device for operating said switching means between open and closed circuit conditions responsive to a pre-selected food temperature; manual control means for operating said switching means between open and closed circuit conditions; a door covering an opening in said oven, said door being movable between a closed and a partially open position; means to releasably hold said door open when it reaches said partially open position; means to open said door from a closed to said partially open position; an electrical means to actuate said opening means; a second circuit for connecting said actuator means to said energy source; switching means operable between open circuit and closed circuit condition in said second circuit; and a selector switch having timer control, thermometer control, and manual control positions for selectively establishing either timer control, thermometer control or manual control over the switching means in said first and said second circuits, the movement of said selector switch to said timer control position operating said switching means to close said first circuit and interrupt said second circuit at a first pre-set time, and to interrupt said first circuit and close said second circuit at a second pre-set time, the movement of said selector switch to said thermometer control position operating said switching means to dispose said first circuit in a closed condition and said second circuit in an open condition until food cooking in the oven reaches the pre-selected temperature whereupon said switching means is operated by said thermometer control to open said first circuit and close said second circuit, the movement of said selector switch to said manual control position operating said switching means to close said first circuit and open said second circuit, whereby the oven can be selectively, manually controlled, or automatically operated to partially open the oven door on termination of heating means operation at the conclusion of either a predetermined time interval or after food in the oven reaches a pre-selected temperature, the partially open position of said door facilitating the rapid cooling of said oven, avoiding the overcooking of food.

19. A domestic appliance, comprising, in combination: a cooking oven having a front wall; an access opening in said front wall; a door for said opening, said door being movable from a closed position to a partially open position; means for releasably holding said door in said partially open position; a movable hinge member attached to said door; a heating element to heat said oven to a predetermined cooking temperature level; an electric energy source; a first circuit for connecting said heating element to said energy source, a switch operable between open circuit and closed circuit condition in said first circuit; selectively settable control means for operating said switch between closed and open circuit conditions according to a predetermined cooking schedule; a bracket attached to said hinge member; a ram; means for mounting said ram in operative association with said bracket; electrically actuatable means effective upon energization thereof to operate said ram from a retracted first position to an extended second position, the movement of said ram to its second position exerting a force against said door hinge member bracket causing said door to move from its closed position to its partially open position; a second circuit for connecting said electrically actuatable means to said energy source; a limit switch operable between open circuit and closed circuit conditions in said second circuit, said limit switch having an operating member provided with biasing means disposed in the path of said oven door, the operating member being held in a position corresponding with a closed circuit condition of said limit switch by said door when said door is in its closed position but moving because of said biasing means, to a position corresponding with an open circuit condition of said limit switch when said door is moved to its partially open position; and switch means in said second circuit in series with said limit switch, said second circuit switch means being operable by said control means into open circuit or closed circuit condition, said control means operating said second circuit switch means into closed circuit condition immediately after said heating element becomes inactive due to the opening of said first circuit switch by said control means according to said predetermined cooking schedule, whereby said door is carried by the movement of said ram to its partially open position, said limit switch opening said second circuit as its operating member is released by the opening of the door, said door being held in said partially open position by said holding means, the partially open position of said door facilitating the rapid cooling of said oven below said predetermined cooking temperature level.

20. A domestic appliance, comprising, in combination, an oven, electric heating means therefor, an electric energy circuit for said heating means, a switch in said energy circuit, cooking control means effective to operate said switch to a first position to energize said heating means to initiate a cooking operation and to operate said switch to a second position to de-energize said heating means on attainment of a desired cooking condition in said oven, a door for said oven, electrically operated means to move said door from a closed to a partially open position, a switch for connecting said electrically operated means into said electric energy circuit, means for operating said last-named switch by said cooking control means whereby said switch energizes said electrically operated means for its door-opening operation when said cooking control means operates said first-named switch to its said second position, a third switch in said electric energy circuit, means responsive to the actuation of said electrically operated means in moving the door to its said partially open position to operate said last-named switch to de-energize said electrically operated means, and means for releasably maintaining said door in its said partially open position following de-energization of said electrically operated means.

21. Cooking apparatus, comprising, in combination, a cooking chamber, heating means therefor, means to establish a first condition of operation of said heating means to effect a cooking operation in said chamber, an electric power circuit to establish said first condition, first switch means in said electric power circuit for establishing a second condition of operation of said heating means upon attainment of a predetermined cooking condition within said chamber, a closure for said chamber, means for mounting said closure for movement between first and second positions, a closure operating mechanism, means for mounting said mechanism for operation of said closure from one to another of its positions, electrically actuated means in said electric power circuit for effecting said operation of said closure operating mechanism, second electric switch means in said power circuit, means for closing said second switch means by the action of said first switch means, whereby to energize said electrically actuated means for operation of said closure operating mechanism upon the attainment of the second condition of operation of said heating means, means independent of said second switch means for interrupting the operation of said closure-operating member as said closure moves to its second-named position, and means for releasably maintaining said closure in said position.

References Cited in the file of this patent

UNITED STATES PATENTS

| | | |
|---|---|---|
| 1,162,297 | Meacham | Nov. 30, 1915 |
| 2,101,135 | Finch et al. | Dec. 7, 1937 |
| 2,136,648 | Usselman | Nov. 15, 1938 |
| 2,258,482 | Carpenter | Oct. 7, 1941 |
| 2,558,294 | Finzie | June 26, 1951 |
| 2,617,595 | Alban et al. | Nov. 11, 1952 |